E. A. GRENELLE.
TIRE SETTER.
APPLICATION FILED MAY 17, 1909.

973,035.

Patented Oct. 18, 1910.
2 SHEETS—SHEET 1.

WITNESSES:

INVENTOR:

E. A. GRENELLE.
TIRE SETTER.
APPLICATION FILED MAY 17, 1909.

973,035.

Patented Oct. 18, 1910.
2 SHEETS—SHEET 2.

WITNESSES:

INVENTOR:

UNITED STATES PATENT OFFICE.

EDWARD A. GRENELLE, OF ROCHESTER, NEW YORK, ASSIGNOR TO THE WEST TIRE SETTER COMPANY, OF ROCHESTER, NEW YORK, A CORPORATION OF NEW YORK.

TIRE-SETTER.

973,035.   Specification of Letters Patent.   Patented Oct. 18, 1910.

Application filed May 17, 1909. Serial No. 496,642.

*To all whom it may concern:*

Be it known that I, EDWARD A. GRENELLE, a citizen of the United States, and resident of Rochester, in the county of Monroe and State of New York, have invented certain new and useful Improvements in Tire-Setters, of which the following is a specification.

This invention relates to tire setters, and consists in the construction herein described and claimed.

The object of the invention is to provide positive stops for the compression members of devices of this character, whereby uneven and irregular pressure upon a wheel or tire is obviated, and the circular form of the wheel or tire is accurately secured.

Figure 1:
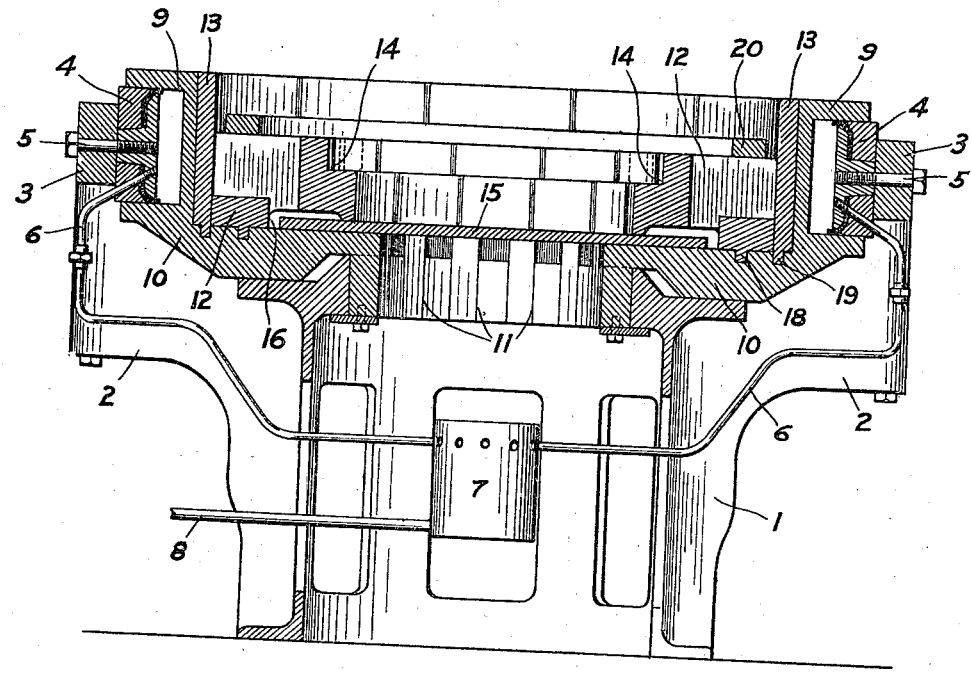
Figure 4:
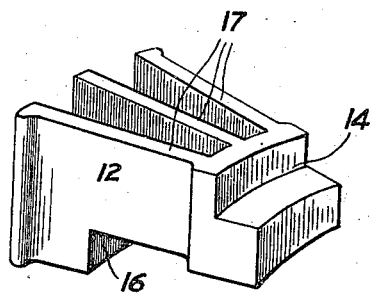
Figure 5:
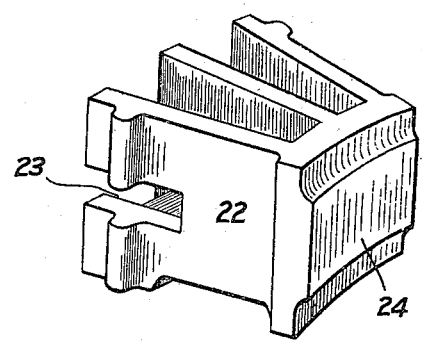
Figure 2:
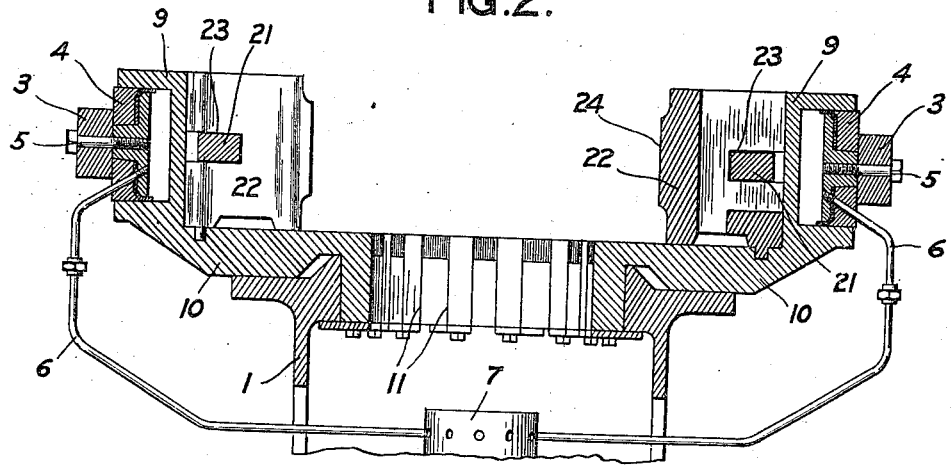
Figure 3:
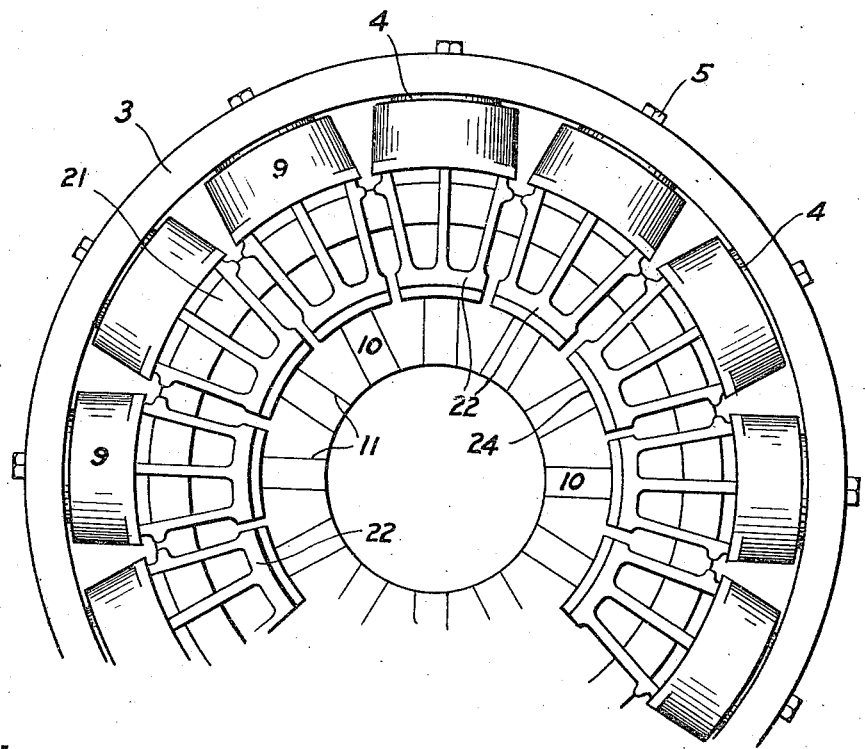

In the drawings: Figure 1 is a vertical cross-section of a tire setter embodying this invention; Fig. 2 is a similar view of a modified construction of the device; Fig. 3 is a plan view of Fig. 2; Fig. 4 is a perspective view of a die shown in Fig. 1; and Fig. 5 is a perspective view of a die shown in Fig. 2.

Referring first to Fig. 1, the machine has a frame consisting of an upright base 1, having radial wings 2 upon which is bolted a heavy ring 3, rectangular in cross-section. On the inner face of said ring are pistons 4, fastened thereto by studs 5, and disposed at equal intervals. In each piston 4 is a pipe 6 that connects with a central drum or pressure-tank 7, into which oil or water is forced from a pump through a pipe 8, and thus the cylinders are actuated simultaneously in a well known way. Coöperating with the pistons 4 are cylinders 9, on the lower sides of which are ribs 10 that enter guide slots 11 in the upper end of the base 1 and radially disposed as to the ring 3. Said cylinders are therefore slidably supported on said base, and may be moved in radial directions toward a center by hydraulic pressure introduced between the stationary pistons 4 and the movable cylinders 9.

In line with each cylinder 9 is a removable die 12 (Fig. 4) that is curved at its rear end to fit the face of a removable gage-plate 13, and has a curved rabbet 14 at its front upper edge forming a pressure-face that is of the proper height and radius to fit the tire that is to be set or compressed. The lower side of the die is cut away so that said die may rest partly upon the top of the slide 10 and partly upon a centrally-located, stationary circular stop plate 15. A shoulder 16 on the lower side of the die 12 is provided, which coöperates with the periphery of the plate 15 in a manner to be described. The dies 12 may be solid, but are shown herewith as having radial ribs 17, thus making a light and strong construction. Said dies may be held in position on the cylinder-slides 10 by lugs 18 (Fig. 1). The gage-plates 13 may be similarly held by projecting lugs 19. Said gage-plates are supported thus so that they may be easily removed and replaced by plates of a different thickness, whereby the position of the pressing edge 14 of the die is varied with respect to the center of the machine.

On the top of the dies 12 lies a stop ring 20 that constitutes a stop for the cylinders 9. The diameter of said ring is such that the gage-plates 13 strike it at the same instant that the shoulders 16 on the dies strike the edge of the stop plate 15. The diameters of the ring 20 and the plate 15 are such that the tire or wheel to be acted upon by the die-shoulders 14 can be compressed to the proper size only before the shoulder 16 and the gage-plate 13 strike the said plate 15 and ring 20, respectively. The tire, therefore, is evenly compressed all around, because the dies are positively stopped equidistant from the center of the machine. Also, because of the fact that one stop is above and the other below the middle line of the pressure-face and the center of the cylinders, the circle of pressure is accurate, the pressure is even, the dies cannot tilt, and the tire cannot be distorted. The ring 20 and the plate 15 are changeable for tires of different sizes.

In the construction illustrated in Figs. 2, 3 and 5, the stop consists of but one ring 21, that surrounds the dies 22, which have recesses 23 in their radial ribs to receive said stop ring. The recess is opposite the middle of the pressure-face 24 and the center of the piston. The stop ring is of such diameter that the inner faces of the cylinders 9 strike it after the tire has its greatest compression. The pressure-face 24 of the die 22 may be of any required shape. Thus also the circle of pressure is exact, the pressure is even, the dies cannot tilt, and the tire cannot be distorted. A further advantage of the use of the two stops, one above and one below the center line of pressure, is that the strains are all equally distributed, and the tendency of the cylinders to twist out of their true lines of movement and the consequent breakage of the machine are practically eliminated.

What I claim is:—

1. In a tire setter, the combination of a frame, tire-setting mechanism comprising a series of cylinders and pistons carried by the frame and arranged to operate toward a center and a series of dies actuated by said cylinders and pistons, and a stop engaged by a portion of said mechanism for limiting the action of the dies upon the tire.

2. In a tire setter, the combination of a frame, a series of cylinders and pistons carried thereby adapted to operate toward a center, a series of dies actuated by said cylinders and pistons, a stop ring for stopping the action of the series of pistons and cylinders on the dies, and a circular stop for stopping the series of dies in a desired position.

3. In a tire setter, a frame, a series of cylinders and pistons carried thereby adapted to operate toward a center, a series of dies actuated by said cylinders and pistons, each having a pressure-face, and circular stop means above and below the middle line of the pressure-faces for stopping the dies in a desired position and for preventing the tilting thereof.

4. In a tire setter, a frame, tire-setting mechanism comprising a series of cylinders and pistons carried by the frame and arranged to operate toward a center and a series of dies actuated by said cylinders and pistons, and stopping means arranged to engage a portion of said mechanism and to arrest the inward movement of the dies by a positive resistance equalized with respect to the plane of the axes of the cylinders and pistons.

EDWARD A. GRENELLE.

Witnesses:
D. GURNEE,
L. THON.